United States Patent
Schreiber

(10) Patent No.: US 8,672,401 B2
(45) Date of Patent: Mar. 18, 2014

(54) VEHICLE SEAT SIDE BOLSTER PILLOW AND BARRIER

(76) Inventor: Catherine Schreiber, New York, NY (US)

( * ) Notice: Subject to any disclaimer, the term of this patent is extended or adjusted under 35 U.S.C. 154(b) by 36 days.

(21) Appl. No.: 13/422,016

(22) Filed: Mar. 16, 2012

(65) Prior Publication Data

US 2012/0242115 A1  Sep. 27, 2012

Related U.S. Application Data

(60) Provisional application No. 61/454,623, filed on Mar. 21, 2011.

(51) Int. Cl.
*B68G 5/00* (2006.01)

(52) U.S. Cl.
USPC ............ 297/182; 297/219.1; 297/284.9; 5/652

(58) Field of Classification Search
USPC ............ 297/182, 284.9, 452.25, 452.26, 297/452.28, 219.1; 5/652
See application file for complete search history.

(56) References Cited

U.S. PATENT DOCUMENTS

| | | | | |
|---|---|---|---|---|
| 2,013,481 A * | 9/1935 | Stonehill | | 5/640 |
| 4,235,472 A * | 11/1980 | Sparks et al. | | 5/652 X |
| 4,506,396 A * | 3/1985 | Ritchie et al. | | 5/631 |
| 4,876,755 A * | 10/1989 | Parrish | | 297/284.3 |
| 5,165,130 A * | 11/1992 | Wendling | | 5/655 |
| 5,193,238 A * | 3/1993 | Clute | | 5/655 |
| 5,216,772 A * | 6/1993 | Clute | | 5/655 |
| 5,272,780 A * | 12/1993 | Clute | | 5/655 |
| 5,310,245 A * | 5/1994 | Lyszczasz | | 297/284.9 X |
| D350,866 S * | 9/1994 | Miller et al. | | D6/501 |
| 5,367,730 A * | 11/1994 | Sher | | 5/655 |
| 5,572,757 A * | 11/1996 | O'Sullivan | | 5/636 |
| 5,906,413 A * | 5/1999 | Yang | | 297/219.1 X |
| 6,067,679 A * | 5/2000 | Rice | | 5/652 X |
| 6,347,421 B1 * | 2/2002 | D'Emilio | | 5/636 |
| 6,782,572 B1 * | 8/2004 | Jones | | 5/640 |
| 6,795,990 B1 * | 9/2004 | Hutchinson D. C. | | 5/652 X |
| 7,188,382 B1 * | 3/2007 | Taylor et al. | | 5/652 X |
| 7,255,396 B1 * | 8/2007 | Anikin | | 297/284.9 |
| 7,527,314 B2 | 5/2009 | Dohan | | |
| 7,614,098 B1 * | 11/2009 | Quarry | | 297/284.9 X |
| 7,614,691 B1 * | 11/2009 | Schmitz | | 297/219.1 |
| 7,736,711 B2 * | 6/2010 | Dobelle | | 297/182 X |
| 7,874,032 B2 * | 1/2011 | North et al. | | 5/652 X |
| 8,336,963 B1 * | 12/2012 | DeMonaco | | 297/411.23 |
| 8,429,775 B2 * | 4/2013 | North | | 5/633 |
| 2008/0061613 A1 * | 3/2008 | Anikin | | 297/284.9 |
| 2009/0134688 A1 | 5/2009 | Waltman | | |
| 2010/0231010 A1 * | 9/2010 | Manley | | 297/182 |
| 2011/0266820 A1 | 11/2011 | Hurwitz | | |
| 2012/0110733 A1 * | 5/2012 | Salvaggio | | 5/652 X |

* cited by examiner

*Primary Examiner* — Rodney B White

(74) *Attorney, Agent, or Firm* — Daniel Boudwin; Global Intellectual Property Agency LLC

(57) ABSTRACT

An automotive bolster pillow for providing a barrier that prevents personal items from falling into a gap between a vehicle seat and a center console. The device comprises an elongated pillow adapted to be pressed into the seat/console gap and optionally have an attached insertion tab or seat belt securement loop. Tab insertion or loop attachment limits the bolster freedom of movement such that the apparatus stays securely in place while the vehicle is in motion. The compressible nature of the interior pillow stuffing material provides users with a comfortable cushion for the driver or passenger while its outward appearance is that of a decorative bolster pillow that matches the interior decor. The device provides a boundary to prevent personal articles and loose change from falling into the seat/console gap.

11 Claims, 2 Drawing Sheets

VEHICLE SEAT SIDE BOLSTER PILLOW AND BARRIER

CROSS REFERENCE TO RELATED APPLICATION

This application claims the benefit of U.S. Provisional Application No. 61/454,623 filed on Mar. 21, 2011, entitled "Betwinx."

BACKGROUND OF THE INVENTION

1. Field of the Invention

The present invention relates to automotive seat pillows and articles that prevent loose articles from being lost within the interior furniture of a vehicle. More specifically, the present invention relates to an elongated, decorative bolster pillow that provides an article barrier, preventing personal items from falling into the space between a seat and the middle console within a vehicle. Personal items that fall into the gaps between vehicle interior seats often become easily lost or irretrievable. Furthermore, in addition to its barrier functionality, the present invention may also serve as an arm rest cushion for users.

2. Description of the Prior Art

Motorized vehicles are a very important part of many individuals' lives. Vehicles provide individuals with mobility and a sense of personal freedom as a vehicle enables an individual to get from one place to another at his or her own leisure and in accords with his or her own time frame. Transportation in a motorized vehicle is often preferred to public transportation because as a driver and/or a passenger one is not necessarily bound to a strict time schedule as is often experienced when using public transportation. Those who are being transported by a motorized vehicle often experience a feeling of independence, empowerment and liberty as they get from one place to another.

Within the interior of a motorized vehicle, it is common to find a seating arrangement wherein there are two chair seats in the front of the vehicle: a driver's seat and a passenger's seat. Whether there are seats in the rear of the vehicle, how many and in what arrangement, often depends on the type of vehicle. The front seats are often of a bucket style seat and are capable of seating a single individual comfortably and independently of the passenger or interior architecture. A center console often sits between the two front seats. Consoles are very popular and serve a variety of useful functions, including the securement of beverages, money, change, cell phones, cell phone chargers and an assortment of other useful items and personal articles. The combination of bucket style front seats and a center console results in the existence of a gap between each seat and the console. Personal items are often accidentally dropped into this space and thereafter are lost. If the item is not lost, and the individual realizes his or her personal item has dropped down into the space between the seat and the console, retrieval of the personal item is often a chore or laborious task, as it is generally difficult and awkward to locate the item within the tight confines and dark environment of the seat undercarriage.

Eliminating this common inconvenience is achievable by filling the gap between seats and other interior panels or consoles with a protection barrier or guard device. Such a device prevents personal items from falling from a user's pockets or from the user's seat, and would further eliminate the challenges associated with the retrieval of such lost personal items. The present invention discloses an improved decorative bolster pillow that is particularly suited for automotive use, wherein the pillow is compressed into the space between a seat and a console to keep the bolster pillow in a static position and close this existing gap. The bolster pillow provides a protective barrier mechanism to prevent personal items from falling down into confined automotive interior spaces. The bolster pillow is a foam roll or similar pillow construction with an attached protruding tab that inserts into gaps within a vehicle interior. When inserted the bolster is preventing from moving from its secured position that may result from changes in the vehicles momentum or shifting of the user in his or her seat. The compressible interior stuffing material is covered with decorative outer material that may be adapted to stylistically resemble an elegant, decorative bolster pillow or fit in with the rest of the vehicle interior decor. The present invention is particularly suited for automobile interiors, but can be used in a variety of different vehicles including boats, airplanes and other vehicles. Further embodiments of the bolster pillow include an insertion tab and seat belt clasp loop for secure positioning of the pillow within the vehicle when deployed.

A means of preventing personal items from falling into the space is disclosed and considered to be a highly useful device for everyday motorists. Some solutions are available in the prior art, but these solutions lack a decorative quality and the structure of the present invention. Furthermore, the prior art solutions only serve a single purpose, i.e., preventing personal items from falling between the seat and the console. Theses do not provide a tab for bolster stabilization while in use. For example, U.S. Pat. No. 7,527,314 to Dohan describes a semi-rigid vehicle space guard that is specifically manufactured in a variety of sizes and shapes as to custom-fit into and occupy the space between a seat and the console of particular makes and models of vehicles as indicated by the standard vehicle gap specifications. The device is three dimensional and contours to complimentarily fit the gap, matching the curvature of the seat cushion and having a cut out notch for the seat belt buckle to fit through. One embodiment of the device utilizes a semi-solid foam construction that allows for the guard to be compressed slightly and inserted into the space. Once inserted, the material expands to form-fit the space. The contoured, custom-fit nature of the device is mirrored on the top and bottom of the device, which allows for the device to be used both in between the console and the driver's seat, as well as in between the console and the passenger's seat, by merely turning the device over and using it for the other space.

The Dohan device is specifically tailored to fit the space between a seat and the console of particular makes and models of vehicles as indicated by the standard vehicle gap specifications. Therefore, the Dohan device is not for interchangeable use in different makes and models of vehicles. The present invention is a guard for preventing personal items from falling into the space between a seat and the console and is for use in any make and model of vehicle. The compressible nature of the present invention, along with its optionally attached tab or seat belt loop, allows for the apparatus to be inserted and secured into any space between the seat and the console, regardless of the shape of the space. Additionally, the cylindrical nature of the bolster pillow is larger than the space between the seat and the console, thus the present invention creates a guard that completely covers the space beneath it regardless of how large the space between the seat and console is.

Similarly, U.S. Patent Application No. 2011/0266820 to Hurwitz describes a console and bucket seat gap protective device that prevents small items from falling into the space between. The device features a means of attaching the device to the console and the seat and has an overall concave shape along the gap, forming a trough-like area, with one embodiment describing an overall U-shape along the gap and another embodiment describing an overall V-shape along the gap. The concave area of the device can be used as storage space for important items, such as credit cards, E-Z Pass tags, writing implements, sunglasses and other similar convenience items that are useful to have on hand while an individual is driving. One embodiment of the device integrates LED or fiber optic lighting into the construction of the device to provide additional illumination during dimly lit or darkened conditions. Another embodiment has an insertion point into which scented sticks may be inserted into the device. The scented sticks then permeate the interior of the vehicle with fragrance.

The Hurwitz device is designed to hold various useful items in the trough-like area that results from the curvature of the device. The device is capable of holding a variety of useful items and prevents personal items from falling into the space between the seats and the console. Likewise, crumbs and food debris can fall into, and collect in, the trough-like area of the device. Similarly, dirt and other debris can accumulate in the trough. These undesirable accumulations are unsightly and make the interior of the vehicle appear dirty and unkempt. The present invention bolster pillow is cylindrical in shape, giving the top of the device a convex curvature that does not permit any debris from accumulating on the apparatus.

U.S. Patent Application No. 2009/0134688 to Waltman describes a seat gap member that an individual wedges into the space between the seat and the center console. The device is a thin section of material, having a slightly larger area at the top of the member than the bottom. The device slips into the space either from above, or from the front of the gap in relationship to the front of the vehicle. The device has two mounting surfaces, one that makes contact with the console and the other, which makes contact with the side of the seat when the device is inserted into the gap. The device is intended to prevent items from falling into the gap, as well as to prevent the accumulation of debris in the space between the seat and the console.

The prior art patents and published patent applications exhibit several drawbacks of which the present invention aims to correct. The present invention is a pillow for serving as a guard to prevent personal items from falling into a gap between the seat and the center console in a vehicle. The device can further provide a location for which to place a small pet while traveling, if desired. A common problem solved by the present invention and associated with most vehicle center consoles is that the driver and the passenger often both wish to use the console as an arm rest, but the space is often limited or too small to accommodate both the driver's and the passenger's arm simultaneously. The bolster pillow apparatus of the present invention broadens the area upon which a driver and/or a passenger may rest his or her arm by increasing the usable area upon which a user's arm may rest. Additionally, the present invention is an attractive space guard that can be designed with an outward appearance that matches, accentuates or compliments an existing vehicle interior. The exterior of the bolster pillow apparatus is covered in decorative, elegant material that may match or offset the vehicle interior. Contemplated materials include fabrics, leather, suede and similar materials utilized in automotive interiors and for comfortable pillow devices. The ends of the cylindrical pillow device may further be manufactured in various styles of decoration, featuring attractive trim and/or tassels.

It is therefore submitted that the present invention substantially diverges in design elements from the prior art and consequently it is clear that there is a need in the art for an improvement to existing seat gap guard devices. In this regard the instant invention substantially fulfills these needs.

SUMMARY OF THE INVENTION

In view of the foregoing disadvantages inherent in the known types of seat gap guards now present in the prior art, the present invention provides a new improved bolster pillow apparatus wherein the same can be utilized for providing a convenient space guard to prevent personal items from falling between a vehicle seat and a center console while also serving as a comfortable arm rest.

It is therefore an object of the present invention to provide a new and improved bolster pillow apparatus for use in a vehicle that has all of the advantages of the prior art and none of the disadvantages.

It is another object of the present invention to provide an aesthetically pleasing seat gap guard apparatus that is elegant in styling and can be manufactured in a variety of patterns, colors and materials as to match or compliment the interior of the vehicle.

Another object of the present invention is to provide an improved bolster pillow with an attached tab that inserts into the space between a seat and a center console in a vehicle to secure its position while in use.

Yet another object of the present invention is to provide a pillow arm rest that extends the surface area utilizable by a driver and/or passenger to rest their arms upon and places the arm rest of the console in closer proximity to the driver and/or passenger while seated in the vehicle.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
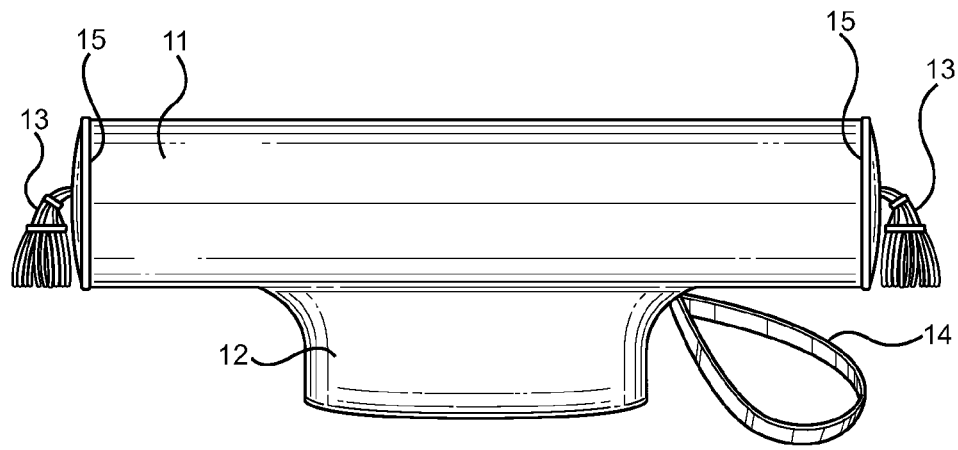
FIG. 1 is a frontal view of one embodiment of the present invention showing the length of the bolster pillow apparatus with the attached tab and the construction thereof.

Reference is made herein to the attached drawings. Like reference numerals are used throughout the drawings to depict like or similar elements of the present invention bolster pillow apparatus. For the purposes of presenting a brief and clear description of the present invention, the preferred embodiment will be discussed as used as a guard for preventing personal items from falling down the space between a seat and the center console in a vehicle. The figures are intended for representative purposes only and should not be considered to be limiting in any respect.

Referring now to FIG. 1, there is shown a frontal view of an embodiment of the present invention. The present invention base structure is a compressible structure having an outwardly decorative appearance and elongated body in which to expand and fill an automotive gap. Embodiments of the present device comprise an improved bolster pillow 11 having an attached securement tab 12 running along its ventral side length or attached seat belt loop 14 for improved securement during deployment. The pillow has an elongated and preferably cylindrical shape, while the securement tab 12 extends radially downward. The apparatus has two ends: a forward and rear end termination, wherein each end may employ decorative accoutrements attached thereto, including as tassels 13 and other decorative trim 15. One embodiment of the present invention incorporates a closed loop 14 that attaches to the pillow 11 and provides securement to a seat belt buckle or similar structure while in use. The addition of the seat belt loop makes the two ends of the device asymmetrical, and differentiates the rear end of the bolster pillow from the forward end. The rear end of the bolster pillow apparatus 11 is identifiable by the attachment of a seat belt loop 14, while the forward end is adapted to protrude in a forward vehicle direction while being utilized in a motor vehicle. The seat belt loop loops over a seat belt buckle, completely encircling the buckle prior to being engaged with a seat belt clasp for securement thereto. Other embodiments of the present invention do not include an attached seat belt loop, thus resulting in the bolster pillow apparatus having a symmetrical forward and rear end. The distinction between the front and back end of the apparatus in those embodiments is irrelevant. In a final embodiment, the tab and loop securement means is removed to provide a compressible member that secures via compression between a vehicle seat and a center console or door interior panel. The use of an elongated member to provide a gap filler is a new and novel concept with regard to bolster pillows, and may be provided to match an interior decor, style or material.

The present invention requires installation into the gap between the seat and the center console of a vehicle. Installation is a simple process requiring the user to first insert the attached tab 12 of the bolster pillow into the interior vehicle gap and then to de\press the bolster pillow into place such that the attached tab is no longer visible and concealed by the seat and the console. The attached tab 12 of the present invention extends along the lower length of the bolster pillow 11 and protrudes away therefrom a sufficient distance as to insert into this space while keeping the body portion of the pillow above the gap and keeping the bolster pillow securely in place as the vehicle moves. A second embodiment of the present invention has an attached tab that extends along the length of the bolster pillow, while another embodiment of the present invention does not incorporate an attached tab and is of simpler construction. For those embodiments which incorporate an attached tab along the length of the bolster pillow, the tab is not visible when the bolster pillow apparatus inserts into the space between a seat and the center console of a vehicle.

The bolster pillow apparatus has an exterior surface and an interior filling of compressible pillow stuffing. The exterior of the bolster pillow is covered in a highly durable and easily cleaned material that may be adapted to provide decorative flare, blend in or accent an existing vehicle interior. The material may further conform to automotive interior safety standards, and provide features such as being flame retardant, stain resistant or wrinkle resistant. The device is adapted to be manufactured in any number of colors, patterns and sizes, with various decorative trimmings and/or features provided in various combinations as to suit a user's desires with respect to its look within the interior of his or her vehicle. Contemplated materials include any known and commonly utilized materials or fabrics used in the vehicle, pillow and furniture industry. The exterior may further be made from leather, suede or other typical interior trimming material. One embodiment of the present invention for use in water craft vehicles, such as boats or yachts, utilizes an exterior fabric that is water proof and mold resistant.

The interior of the bolster pillow apparatus comprises of a compressible pillow stuffing material, such as, but is not limited to, cotton stuffing, polyester stuffing or feather pillow stuffing, a foam roll, or microbeads. The attached tab may be of solid construction or provided in the same stuffed construction as the body portion of the pillow. The compressible nature of the stuffing material allows for the pillow and attached tab to be compressed slightly upon insertion into the space between the seat and the console. Once installed, the compressible material expands to its pre-compressed state to snuggly fit into the space and provide a comfortable perch upon which a user may rest his or her arm.

Figure 2:
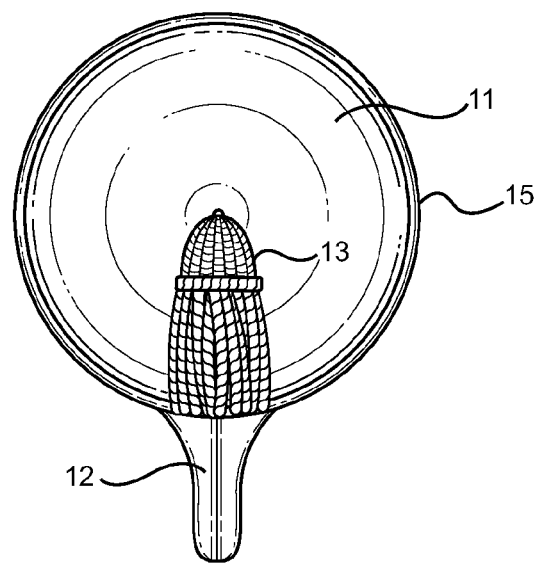
FIG. 2 is an end view of the present invention of the apparatus showing the decorative end and construction.

Referring now to FIG. 2, there is shown an end view of the present invention. Each end termination of the bolster pillow preferably has a circular face, which can be further lined with decorative accoutrements 13 and trim 15. At the center of the circular face of each end, a decorative tassel 13 may be provided for improved flare and decoration. Other embodiments of the present invention replace the decorative tassel with useful items, such as a secret pocket which extends into the interior of the bolster pillow. The pocket is long and narrow and capable of holding writing implements. Another embodiment incorporates a heating element into the center of the apparatus through the center of the circular face on one end of the present invention. The heating element is capable of plugging into the cigarette lighter of the vehicle as a power source. This particular embodiment of the present invention provides a warm arm rest cushion where the driver and/or passenger can rest his or her arm.

The attached tab extends downward, protruding away from the bolster pillow a sufficient distance as to insert into the space between a seat and a center console. To insert the device, the user compresses the attached tab slightly as he or she inserts the device into the space between the seat and the console. After insertion, the compressible material gradually expands back to its pre-compression state to snuggly fit in the space. The bolster pillow is thus limited in its freedom of movement and stays in place while the vehicle is in motion.

Figure 3:
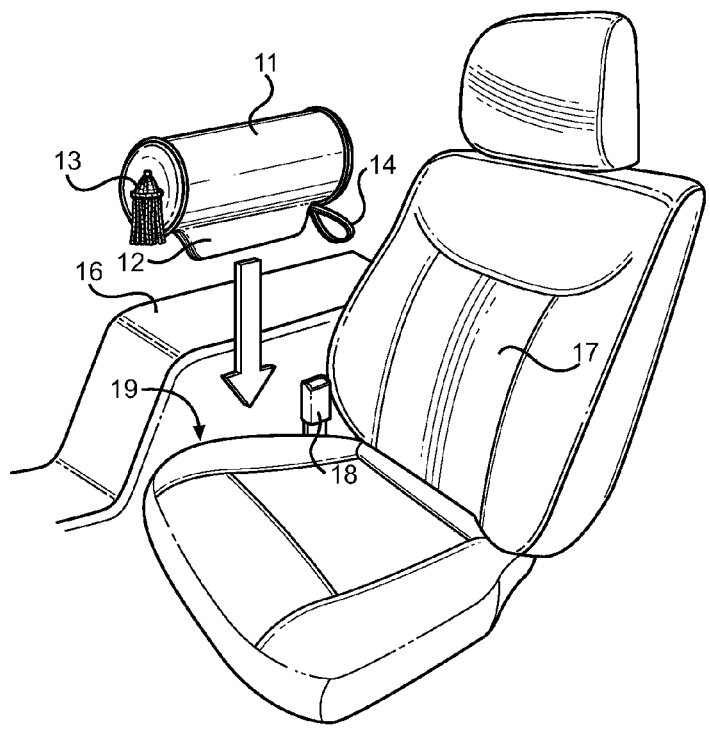
FIG. 3 is a perspective view illustrating how the present invention is inserted into a gap between a vehicle seat and the center console.

Referring now to FIG. 3, there is shown a perspective view of the present invention and illustration showing the apparatus being inserted into the gap 19 between a driver's side seat 17 in a vehicle and a center console 16 starting from an elevated starting position above the gap 19. Similarly, the apparatus 11 can be inserted into the space between a passenger's side seat and the center console of a vehicle. The attached tab 12 of the bolster pillow inserts into the space 19 either from above, or from the front of the space, sliding into a secure position therein. The embodiment shown in FIG. 3 inserts into the space 19 from above. FIG. 3 also depicts an embodiment that incorporates an attached seat belt loop 14, which engages a seat belt buckle 18 that is located between the seat 17 and center console 16. The loop 14 is placed over the seat belt buckle 18, wherein the buckle is inserted through the loop 14 interior. When a driver or passenger fastens his or her seat belt, the bolster pillow apparatus 11 is also secured into place as the seat belt loop 14 limits the ability of the apparatus to move or slide due to any motion of the vehicle when the seatbelt clasp is engaged through the loop and into the buckle 18.

Figure 4:
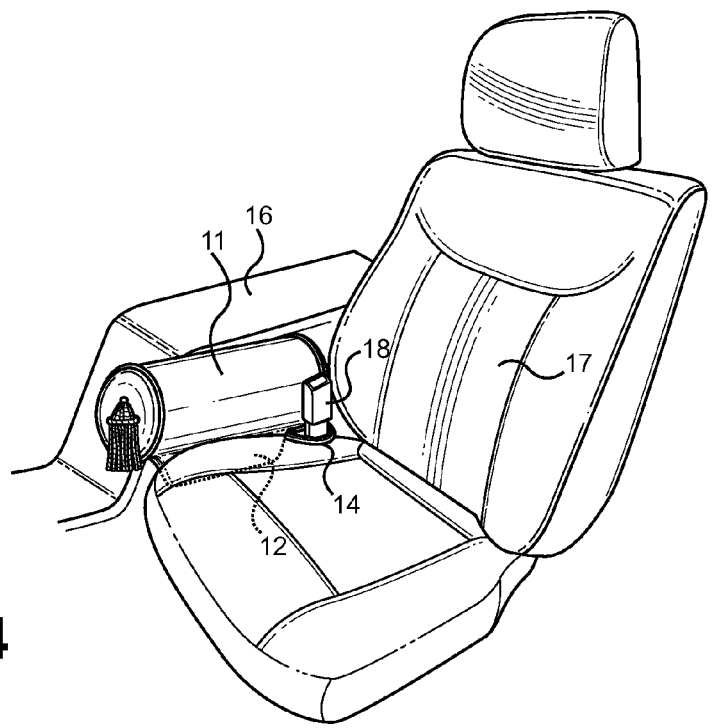
FIG. 4 is a perspective view of the present invention in a working position, inserted into the space between a seat and the center console of a vehicle.

Referring now to FIG. 4, there is shown a perspective view of the present invention after insertion into the gap 19 between the seat 17 and the center console 16, wherein the device is shown in a working position. The embodiment depicted in FIG. 4 is a bolster pillow that incorporates an attached seat belt loop 14 and decorative outer features. The compressible nature of the interior stuffing material of the pillow provides users with comfortable arm support or barrier between their body and the center console. Upon installation, the apparatus serves as an arm rest extension cushion for the driver or passenger, while primarily serving as a guard that prevents personal items from falling into the gap between the seat and the center console. Other applications for the bolster pillow apparatus may include, for example, inserting the apparatus into the space between a seat in a vehicle and a closed vehicle door or the side wall of a vehicle.

A new use for, and an improved bolster pillow apparatus, are herein described. The device is an improved bolster pillow with an attached tab that a user installs into a gap between the side of a seat and the center console of a vehicle to prevent personal items from falling into the space. The user presses the device into the space until the attached tab is no longer visible, giving the apparatus an overall outward appearance of a decorative bolster pillow or extension of the vehicle interior (depending on its outward appearance). Insertion of the tab into the space limits the freedom of movement of the bolster pillow, such that the apparatus stays in place while the vehicle is in motion. Embodiments of the present invention include an attached seat belt loop that loops over the seat belt buckle, interior heating elements for colder climates, outer decorative features and materials, and finally an inner pocket that provides for user storage of items. The compressible nature of the interior pillow stuffing material provides users with a comfortable arm rest cushion for his or her arm and a barrier that can adapt to different dimensions and interior geometries to ensure a tight fit therein.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An improved bolster pillow apparatus, comprising:
   an elongated pillow having a length, an interior volume and a forward and rear end; said pillow interior having a compressible filling material;
   a gap insertion tab along said cylinder length and extending outward;
   wherein said gap insertion tab extends along the length of and protrudes away from said bolster pillow;
   wherein said tab further tapers in width as it extends away from said pillow for placement in a confined space;
   wherein said bolster pillow further comprises an attached seat belt loop positioned between said bolster pillow and said tab, said loop being adapted to be engaged by a vehicle seat belt buckle.

2. The device of claim 1, wherein said pillow has a generally cylindrical shape.

3. The device of claim 1, wherein said pillow ends further comprise decorative trim around.

4. The device of claim 1, wherein said pillow interior further comprises an internal compartment and access thereto along one end to provide a storage compartment.

5. The device of claim 1, wherein said pillow interior further comprises an electrical heating element.

6. The device of claim 1, wherein said tab is further comprised of a solid construction.

7. The device of claim 1, wherein said tab further comprises a pillow construction to allow compression into a gap and expansion thereof to seal said gap.

8. An improved bolster pillow apparatus, comprising:
   an elongated pillow having a length, an interior volume and a forward and rear end;
   a gap insertion tab along said cylinder length and extending outward;
   said pillow interior having a compressible filling material that expands once compression is removed to fill a gap and prevent discrete objects from falling into said gap and between said expanded pillow,
   said pillow providing an outward appearance and material to match a vehicle interior decor;
   wherein said gap insertion tab extends along the length of and protrudes away from said bolster pillow;
   wherein said tab further tapers in width as it extends away from said pillow for placement in a confined space;
   wherein said bolster pillow further comprises an attached seat belt loop positioned between said bolster pillow and said tab, said loop being adapted to be engaged by a vehicle seat belt buckle.

9. The device of claim 8, wherein said pillow ends further comprise decorative trim around.

10. The device of claim 9, wherein said pillow interior further comprises an internal compartment and access thereto along one end to provide a storage compartment.

11. The device of claim 9, wherein said pillow interior further comprises an electrical heating element.

* * * * *